United States Patent [19]

Mitsuyasu et al.

[11] Patent Number: 4,589,279
[45] Date of Patent: May 20, 1986

[54] APPARATUS AND METHOD FOR DETECTING INTAKE AIR MASS FLOW RATE

[75] Inventors: Masaki Mitsuyasu; Toshiyuki Takimoto; Keiji Aoki, all of Susono, Japan

[73] Assignee: Toyota Jidosha Kabushiki Kaisha, Toyota, Japan

[21] Appl. No.: 733,146

[22] Filed: May 13, 1985

[30] Foreign Application Priority Data

Sep. 4, 1984 [JP] Japan ................... 59-183783

[51] Int. Cl.⁴ ............................................. G01F 1/32
[52] U.S. Cl. ............................ 73/118; 73/861.22;
123/494; 123/488; 123/478; 123/480
[58] Field of Search ............ 123/494, 488, 478, 480,
123/440; 73/118 A, 861.22

[56] References Cited

U.S. PATENT DOCUMENTS

| | | | |
|---|---|---|---|
| 3,967,596 | 7/1976 | Comeley | 123/494 |
| 4,142,407 | 3/1979 | Kuroiwa et al. | 73/861.22 |
| 4,228,768 | 10/1980 | Kita | 123/494 |
| 4,411,235 | 10/1983 | Shinoda et al. | 73/118 A |
| 4,448,081 | 5/1984 | Kolitech et al. | 73/861.22 |
| 4,455,985 | 6/1984 | Asayama | 123/494 |
| 4,457,167 | 7/1984 | Enmal | 73/118 A |
| 4,457,281 | 7/1984 | Usyama et al. | 123/494 |
| 4,463,601 | 8/1984 | Rask | 73/118 A |
| 4,478,075 | 10/1984 | Oyama et al. | 73/118 A |
| 4,478,087 | 10/1984 | Asayama | 73/118 A |

Primary Examiner—Raymond A. Nelli
Attorney, Agent, or Firm—Kenyon & Kenyon

[57] ABSTRACT

An apparatus and method for detecting an intake air mass flow rate using a Karman vortex air flow arranged in an intake passage of an internal combustion engine, in accordance with the formula:

$$\gamma(x) = \gamma(760) \times V_p(x) / V_p(760)$$

where $\gamma(x)$ is an intake air density to be obtained; $\gamma(760)$ is the air density under standard atmospheric pressure, $V_p(x)$ is the amplitude value of the analog signal obtained from the Karman vortex air flow sensor; and $V_p(760)$ is the amplitude value of the analog signal under standard atmospheric pressure.

4 Claims, 18 Drawing Figures

EACH INPUT OF FREQUENCY PULSE

APPARATUS AND METHOD FOR DETECTING INTAKE AIR MASS FLOW RATE

BACKGROUND OF THE INVENTION (1) Field of the Invention

The present invention relates to an apparatus and method for detecting an intake air mass flow rate using a Karman vortex air flow sensor for detecting the amount of intake air of an internal combustion engine, more particularly to a method and apparatus for detecting an intake air mass flow rate in an automobile engine provided with an electronically controlled fuel injection apparatus, improving the output signal processing circuit of a Karman vortex air flow sensor of the intake air mass flow rate sensing type.

(2) Description of the Related Art

One of the methods for supplying mixtures of a predetermined air-fuel ratio to the combustion chamber of an automobile engine or other internal combustion engine is to use an electronically controlled fuel injection apparatus of the intake air sensing type. This provides, for example, one or two injectors for injecting fuel into an engine to the throttle body in the case of a single point injection type or a plurality of the same to the intake manifold in the case of a multiple point injection type for control of the opening time of the said injector in accordance with principally the specific volume of intake air of the engine and the engine speed, thereby ensuring that a mixture of the predetermined air-fuel ratio is supplied to the engine combustion chamber.

Air flow sensors used for detection of the specific volume of intake air in an electronically controlled fuel injection apparatus of the intake air sensing type include the flap type, the hot wire type, etc. In recent years, however, the so-called Karman vortex air flow sensor has come into practical application, wherein use is made of the Karman vortex generated alternately near the two sides of a Karman vortex generator provided in an intake passage of an internal combustion engine for the detection of the specific volume of intake air (see Japanese Unexamined Patent Publication (Kokai) No. 57-1913).

Means for using this Karman vortex air flow sensor to accurately detect the volume flow rate of air have been proposed, for example, in Japanese Unexamined Patent Publication (Kokai) No. 58-80523 and Japanese Utility Model Application No. 59-23210.

However, the above-mentioned prior air flow detection means using Karman vortex air flow sensors detect the volume of the air. Therefore, when the engine is operated at a high altitude where the atmospheric pressure is lower than the standard atmospheric pressure (760 mmHg), the mass of intake air actually sucked in decreases by the amount of decrease of the intake air density, leading to deterioration of the air-fuel ratio and, in the worst case, the danger of engine stalling. To prevent this, the detected volume flow rate of the air must be corrected for atmospheric pressure. The prior means for correction of atmospheric pressure of the volume flow rate have been (1) to provide an atmospheric pressure sensor for detecting the atmospheric pressure around the engine and, based on the output of this atmospheric sensor, correcting the volume flow rate of the intake air (Japanese Unexamined Patent Publication (Kokai) No. 57-131841) or (2) feeding back an output signal of, for example, an O$_2$ sensor provided in the exhaust system for detection of the oxygen concentration in the exhaust gas to effect air-fuel ratio adaptive (or learning) control for controlling the air-fuel ratio and thereby correct the volume flow rate of the intake air (Japanese Unexamined Patent Publication (Kokai) No. 57-26229 and Japanese Unexamined Patent Publication (Kokai) No. 58-48739).

In the prior art of the above-mentioned item (1), however, while the control characteristics of the atmospheric pressure sensor are excellent, the cost is high.

Further, in the prior art of the above-mentioned item (2), while there is no increase in cost, when an engine is operated from a high altitude to a low altitude by engine braking, etc., the supply of fuel is terminated (fuel cut) and the feedback control is suspended. Therefore, when the fuel injection is restarted at the low altitude after a long, continuous fuel cut period, the learning correction coefficient is still held at the value of the high altitude before suspension of feedback control. Consequently, the air-fuel ratio largely deviates to the rich side. As a result, the exhaust gas becomes worse and there is a tendency to engine stalling.

SUMMARY OF THE INVENTION

In view of the above-mentioned problems, an object of the present invention is to provide a method and apparatus for detecting an intake air mass flow rate detection using a Karman vortex air flow sensor, wherein the signal processing circuit of the Karman vortex air flow sensor proposed in Japanese Unexamined Utility Model Application No. 59-23210 is improved so as to be able to detect the intake air mass.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
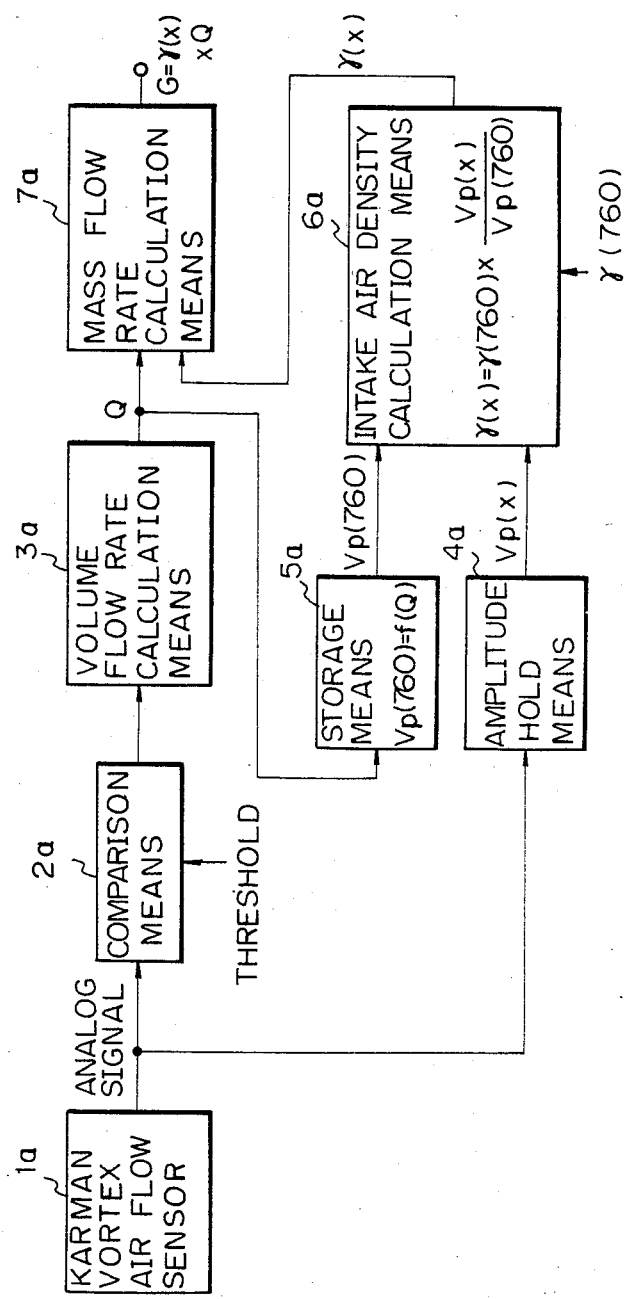
FIG. 1 is a block diagram of a basic constitution of an intake air mass flow rate detection apparatus according to an embodiment of the present invention.

FIG. 1 is a block diagram of a basic constitution of an intake air mass flow rate detection apparatus according to an embodiment of the present invention. In FIG. 1, the intake air mass flow rate detection apparatus is constituted by being provided with a Karman vortex air flow sensor 1a arranged in an intake passage of an internal combustion engine, comparison means 2a for obtaining a digital signal by comparison of an analog signal obtained from the output of the Karman vortex air flow sensor with a predetermined threshold level, and volume flow rate calculation means 3a using a value proportional to the frequency of the digital signal as the intake air volume flow rate; and further provided with amplitude hold means 4a for holding the amplitude value of analog signals obtained from the output of said Karman vortex air flow sensor 1a; storage means 5a for storing in advance a relationship between the intake air volume flow rate and the amplitude value of the analog signals obtained from the ouput of the Karman vortex air flow sensor 1a under standard atmospheric pressure; an intake air density calculation means 6a for calculating an intake air density (x) in accordance with the formula:

$$\gamma(x) = \gamma(760) \times V_p(x)/V_p(760)$$

where $\gamma(760)$ is the air density under standard atmospheric pressure, $V_p(x)$ is the amplitude value of the analog signal held in the amplitude hold means, and $V_p(760)$ is the amplitude value of the analog signal under standard atmospheric pressure; and mass calculation means 7a for multiplying the intake air volume flow rate obtained by the volume flow rate calculation means by the intake air density for obtaining the intake air mass flow rate.

Figure 2:
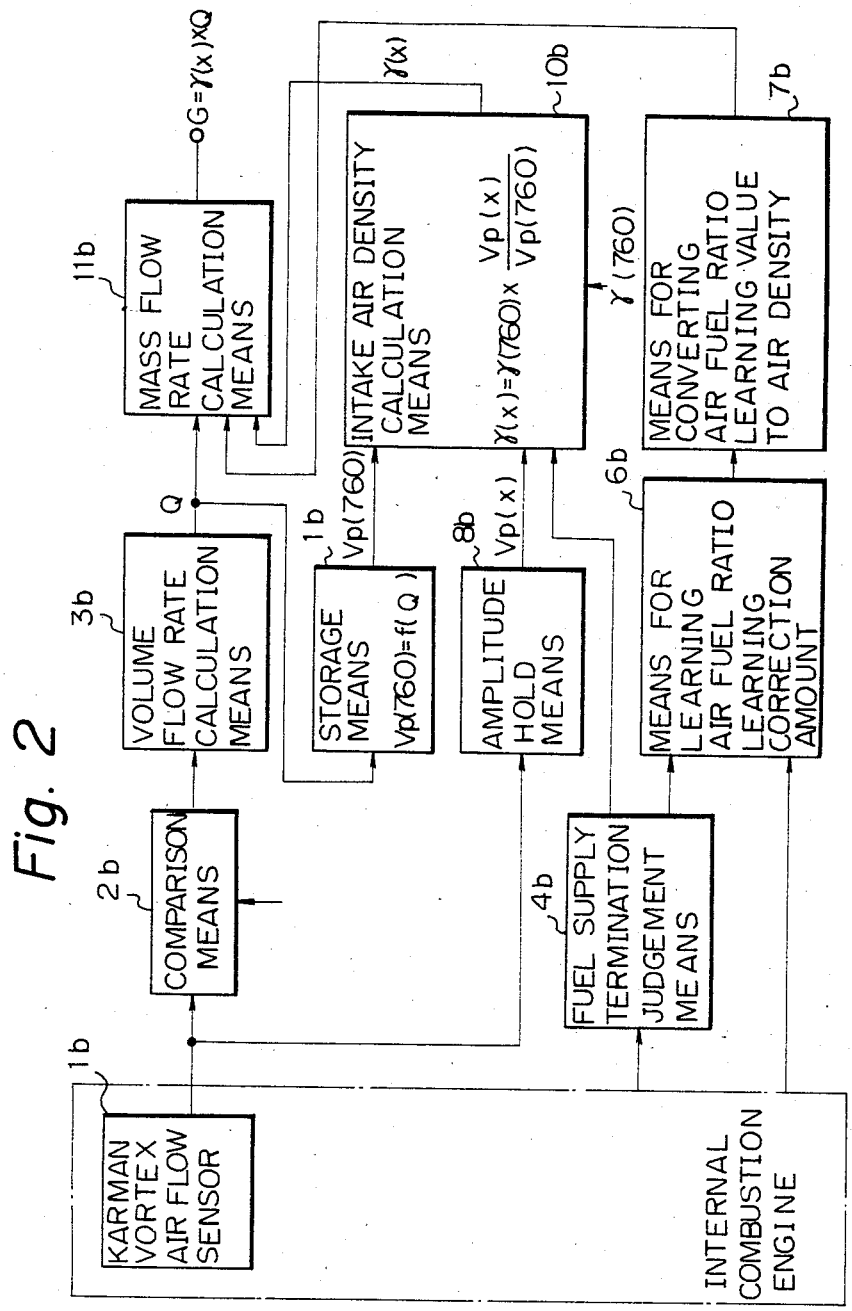
FIG. 2 is a block diagram of another basic constitution of an intake air mass flow rate detection apparatus according to another embodiment of the present invention.

According to another embodiment of the present invention, the intake air mass flow rate detection apparatus is constituted, as shown in FIG. 2, by being provided with a Karman vortex air flow sensor 1b arranged in an intake passage of an internal combustion engine, comparison means 2b for obtaining a digital signal by comparison of an analog signal obtained flow sensor 1b with a predetermined threshold level, volume flow rate calculation means 3b using a value proportional to the frequency of the digital signal as the intake air volume flow rate, fuel supply termination judgement means 4b for judging, based on first operating condition parameters of the internal combustion engine 5b, whether the termination of supply of fuel to said internal combustion engine 5b should continue a predetermined time or more, means 6b for learning, based on second operating condition parameters, an air-fuel ratio learning correction amount during supply of the fuel or when the time of termination of supply of the fuel is shorter than the predetermined time, and conversion means 7b for converting the air-fuel ratio learning correction amount to intake air density; and further provided with amplitude hold means 8b for holding the amplitude value of analog signals obtained from the output of the Karman vortex air flow sensor 1b; storage means 9b for storing in advance a relationship between the intake air volume flow rate and the amplitude value of the analog signals obtained from the output of the Karman vortex air flow sensor 1b under standard atmospheric pressure; an intake air density calculation means 10b for calculating an intake air density $\gamma(x)$ during termination of th e supply of the fuel for a predetermined time or more in accordance with the formula:

$$\gamma(x) = \gamma(760) \times V_p(x)/V_p(760)$$

where $\gamma(760)$ is the air density under standard atmospheric pressure, $V_p(x)$ is the amplitude value of the analog signal held in the amplitude hold means when the termination of supply of the fuel continues for a predetermined time period, and mass calculation means 11b for multiplying the intake air volume flow rate obtained by the volume flow rate calculation means by the intake air density obtained by the conversion means or the intake air density calculation means for obtaining the intake air mass flow rate.

The air density $\gamma(x)$ at atmospheric pressure $\times$ mmHg is calculated by the intake air density calculation means 6a or 10b as follows:

$$\gamma(x) = \gamma(760) \times V_p(x)/V_p(760)$$

Here, $\gamma(760)$ is the air density under standard atmospheric pressure (760 mmHg), $V_p(x)$ is the amplitude of the signal obtained at the output of the Karman vortex air flow sensor 1a or 1b, and $V_p(760)$ is the amplitude of the output signal of the Karman vortex air flow sensor under standard atmospheric pressure (760 mmHg) corresponding to the intake air mass flow rate Q.

The reason that the above-mentioned equation stands is as follows. That is, the output of the Karman vortex air flow sensor 1a or 1b, as mentioned in detail later, is a light signal which is photoelectrically converted and taken out as an analog signal. The amplitude $V_p(x)$ of the analog signal is proportional to $\gamma(x) V^2$. However, V is the speed of flow of the air and is proportional to the intake air mass flow rate Q. Therefore, the amplitude $V_p(X)$ of the light signal is proportional to the density $\gamma(x)$ for the same intake air mass flow rate Q and the above-mentioned equation stands.

On the right hand side of the above equation, $V_p(760)$ is stored in the storage means beforehand as the function of the intake air volume flow rate Q. The value corresponding to the detected intake air mass flow rate is read out as $V_p(760)$. $V_p(x)$ is the amplitude of the output signal of the Karman vortex air flow sensor and is held in the peak holding means.

The peak holding means 4a or 8b can be realized extremely easily with a conventional peak holding circuit and does not lead to an increase in costs.

Below, embodiments of the present invention will be explained in detail.

Figure 3:
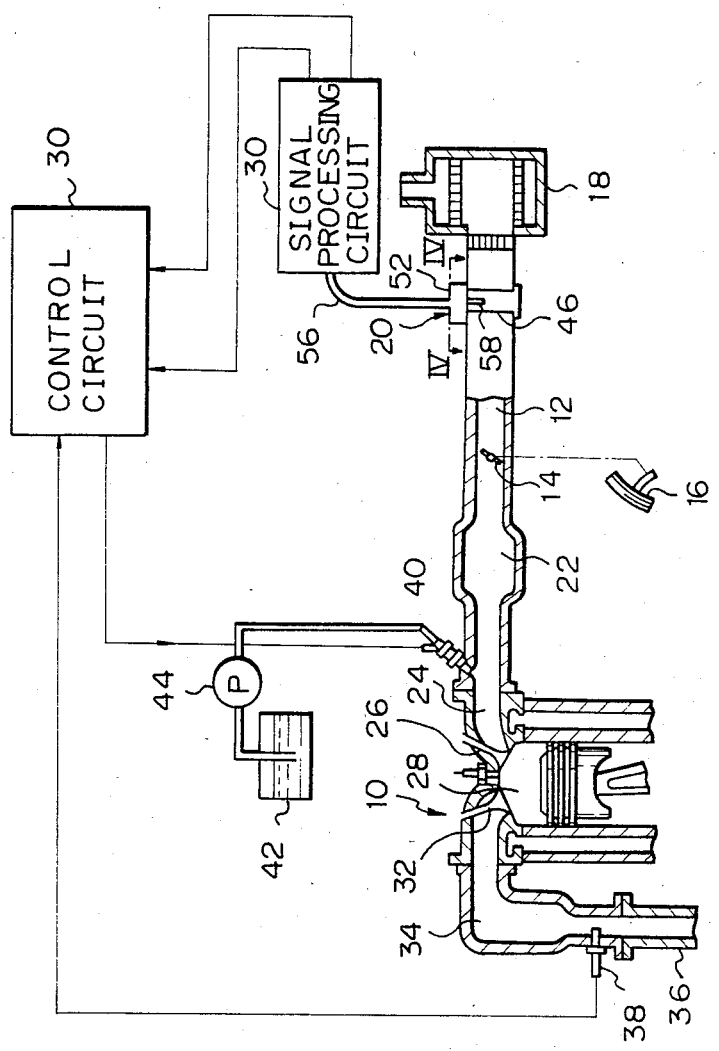
FIG. 3 is a schematic diagram showing an internal combustion engine of an electronically controlled fuel injection type with a Karman vortex air flow sensor.

FIG. 3 is a schematic view of an internal combustion engine of the electronically controlled fuel injection type provided with a Karman vortex air flow sensor. In FIG. 3, reference numeral 10 is in the engine body, 12 an intake passage, and 14 a throttle valve provided in the intake passage 12. The throttle valve 14 is connected to an accelerator pedal 16 in the automobile cabin.

The air sucked in through an air cleaner 18 is supplied through the intake passage 12, which includes a Karman vortex air flow sensor 20 as used in the present invention, the throttle valve 14, a surge tank 22, an intake port 24, and an intake valve 26, to a combustion chamber 28.

The analog signal output from the Karman vortex air flow sensor 20 is sent through a signal processing circuit 30, as a digital signal expressing the intake air volume flow rate and a peak signal holding the amplitude of the analog signal, to a control circuit 31.

The exhaust gas after combustion is exhausted outside from the combustion chamber 28 through an exhaust valve 32, exhaust manifold 34, and exhaust pipe 36. The exhaust manifold 34 is provided with a concentration sensor 38 (in this embodiment, an O₂ sensor for detecting the oxygen concentration) for detecting the concentration of specific components in the exhaust gas, for example, the oxygen concentration or carbon monoxide concentration. A voltage signal output from this O₂ sensor 38 is also sent to the control circuit 31.

Fuel injection valves 40 are provided near the intake port 24 at positions corresponding to each cylinder. These open and close in accordance with drive signals provided from the control circuit 31 for intermittent injection of fuel from a fuel tank 42 as pressurized by a pump 44.

Figure 4:
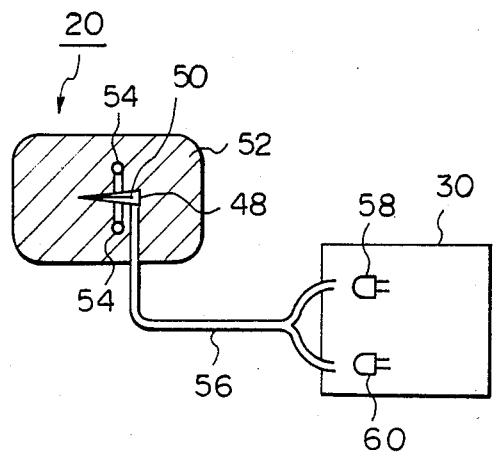
FIG. 4 is a cross-sectional view along line IV–IV of FIG. 3.

FIG. 4 is a cross-sectional view of FIG. 3 along line IV—IV. In FIG. 3 and FIG. 4, the Karman vortex air flow sensor 20 is provided with a Karman vortex generator 46 disposed in the intake passage 12, a Karman vortex air flow sensor body 52 including a vibration plate 50 which displaces cyclically in a vibration chamber 48 due to pressure fluctuations alternately caused near the two sides of the said Karman vortex generator 46, and a pressure leading port 54 for leading the pressure fluctuations generated in the intake passage 12 to the vibration chamber 48 in which the vibration plate 50 is accommodated. The vibration chamber 48 is connected through an optical fiber 56 to a light emitting element 58 or light receiving element 60 in the signal processing circuit 30.

Figure 5:
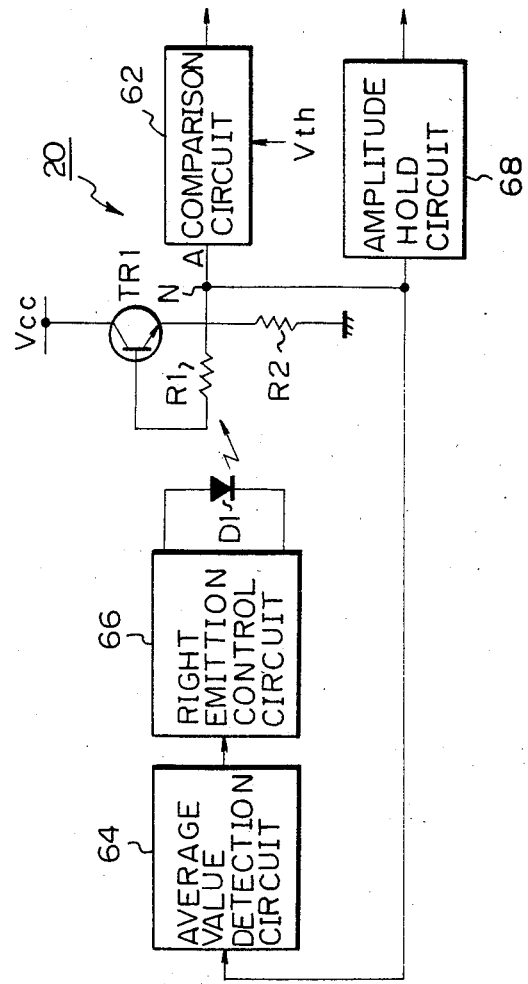
FIG. 5 is a block circuit diagram showing an embodiment of the signal processing circuit shown in FIG. 3 and FIG. 4.

FIG. 5 is a block circuit diagram of an embodiment of the signal processing circuit shown in FIG. 3 and FIG. 4. In FIG. 5, the signal processing circuit 30 is provided with the light emitting element 58, for example, light emitting diode D1, for radiating light on the vibration plate 50 (FIG. 4), the light receiving element 60, for example, the phototransistor TR1, for converting the cyclic changes in the amount of reflected light due to displacement of said vibration body into analog signals, a comparison circuit 62 for converting it into the digital signal of a frequency proportional to the intake air mass flow rate, i.e., frequency pulse, an average value detection circuit 64 for detecting the average value of the analog signals of the output of the said phototransistor TR1, and a light emission control circuit 66 for feedback control of the amount of electric power to be conducted to the light emitting diode D1 so as to obtain a constant value of the average value.

The above construction of the signal processing circuit 30 itself has already been proposed in Japanese Utility Model Application No. 59-23210 of the same applicant.

The signal processing circuit 30 is, according to the present invention, further provided with an amplitude hold circuit 68 for holding the amplitude of the output signal of the phototransistor TR1 as a light receiving element.

Incidentally, in the figure, R1 and R2 are resistors and $V_{cc}$ is the power source voltage.

Figure 6:
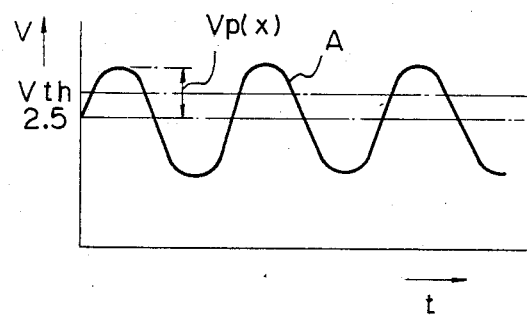
FIG. 6 is a waveform diagram of an output signal of the phototransistor shown in FIG. 5.

FIG. 6 is a waveform diagram of analog signals at the output of the phototransistor TR1 shown in FIG. 5, i.e., the node N. As shown in the figure, an analog signal A similar to a sine wave of amplitude $V_p(x)$ oscillating with respect to 2.5 V is obtained at the emitter of the phototransistor TR1 which acts as the light receiving element 58 in accordance with the oscillation period by which the vibration plate 50 (FIG. 4) of the Karman vortex air flow sensor 20 oscillates in accordance with the intake air flow rate. The magnitude of the amplitude $V_p(x)$ depends on the specific volume of intake air Q (liter/second), i.e., the flow rate, and the atmospheric pressure $X$ mmHg at the time of intake.

Figure 7:
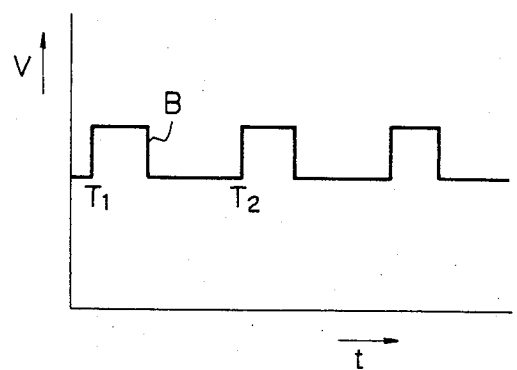
FIG. 7 is a waveform diagram of a frequency pulse obtained from the output signal of a comparison circuit.

FIG. 7 is a waveform diagram of the frequency pulse B obtained at the output of the comparison circuit 62 by comparison of the analog signal A with a predetermined threshold level $V_{th}$ at the comparison circuit 62. The frequency of the frequency pulse B is porportional to the intake air volume flow rate Q (liter/second).

Figure 8:
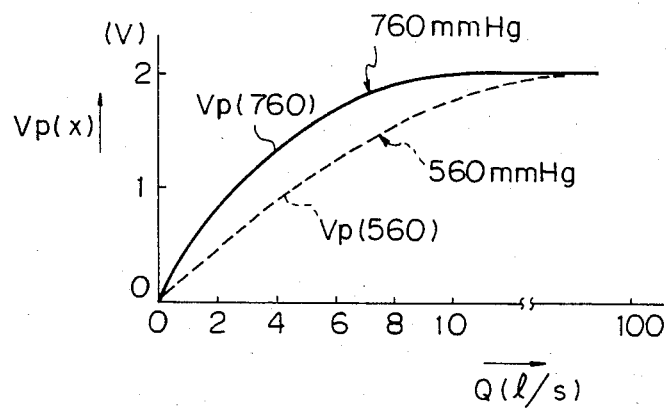
FIG. 8 is a graph showing the relationship between the intake air volume flow rate and amplitude of an analog signal with the atmospheric pressure ×mmHg as a parameter.

FIG. 8 is a graph of the relationship between the intake air volume flow rate Q (liter/second) and the amplitude $V_p(x)$ of the analog signal A, with the atmospheric pressure $X$ mmHg as a parameter. In the figure, it can be understood that, in the case of a constant atmospheric pressure, the amplitude $V_p(x)$ is roughly proportional to the square of the specific volume of the intake air Q, i.e., $Q^2$. Therefore, the amplitude $V_p(x)$ is proportional to $\gamma(x) Q^2$. Here, $\gamma(x)$ is the air density at the atmospheric pressure $X$ mmHg. In the figure, the solid line curve indicates the case of an atmospheric pressure of 760 mmHg and the broken line the case of an atmospheric pressure of 560 mmHg.

Here, if the relationship between the specific volume of the intake air Q and the analog signal $V_p(760)$ at the standard atmospheric pressure of 760 mmHg is stored in advance in the storage apparatus (ROM, discussed later), the atmospheric density $\gamma(x)$ at any atmospheric pressure $X$ mmHg can be calculated from the following equation:

$$\gamma(x) = \gamma(760) \times V_p(x)/V_p(760)$$

The present invention was made in view of this point.

Incidentally, in FIG. 8, the amplitude $V_p(760)$ at 760 mmHg is constant where the specific volume of the intake air Q exceeds 8 liter/second. This is because the deviation angle of the vibration plate 50 shown in FIG. 4 is an extremely small ±5° or thereabouts, and too great a specific volume of intake air results in the vibration plate 50 sticking to the wall of the vibration chamber 48.

Figure 9:
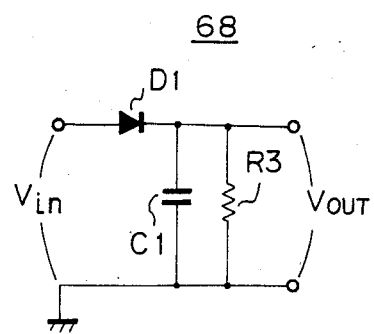
FIG. 9 is a circuit diagram showing an embodiment of the amplitude hold circuit shown in FIG. 5.

FIG. 9 is a circuit diagram of an embodiment of the amplitude hold circuit 68 shown in FIG. 5. In FIG. 9, the amplitude hold circuit 68 can be realized by a known, simple peak holding circuit comprised of a rectifier diode D1 and a parallel connected capacitor C1 and resistor R3.

Figure 10:
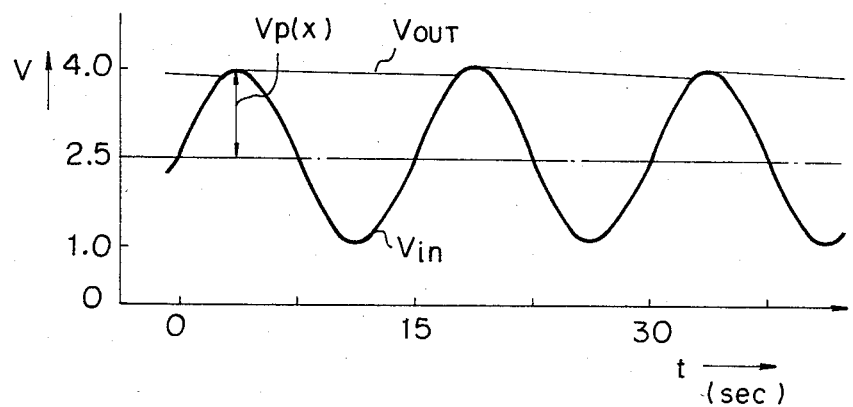
FIG. 10 is a graph showing the input analog signal and output signal of the amplitude hold circuit of FIG. 9.

FIG. 10 is a graph of the input analog signal $V_{in}$ (analog signal A shown in FIG. 6) and the output signal $V_{out}$ of the amplitude hold circuit 68 of FIG. 9. As shown in the figure, the amplitude $V_p(x)$ of the analog signal A is held as the output signal $V_{out}$ across the ends of the capacitor C1.

The frequency pulse obtained at the output of the comparison circuit 62 (FIG. 5) and shown in FIG. 7 and the output signal $V_{out}$ obtained at the output of the amplitude hold circuit 68 and shown in FIG. 10 are input to the control circuit 31 (FIG. 3).

Figure 11:
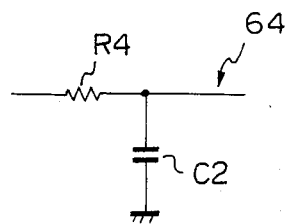
FIG. 11 is a circuit diagram showing an example of the average value detection circuit shown in FIG. 5.

The above-mentioned average value detection circuit 64 is, as shown in FIG. 11 for example, constructed by a CR integration circuit comprised of a resistor R4 and a capacitor C2.

Figure 12:
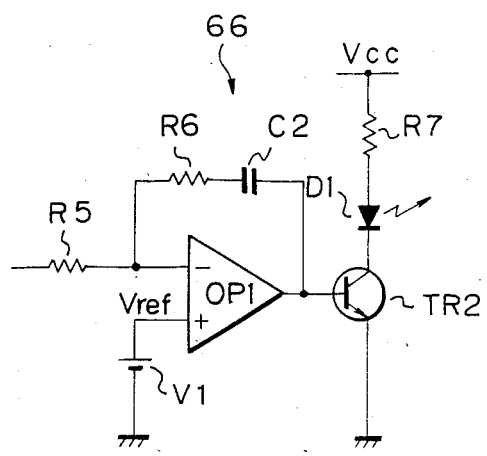
FIG. 12 is a circuit diagram showing an example of the light emission control circuit shown in FIG. 5.

The above-mentioned light emission control circuit 66 is, as shown in FIG. 12 for example, constructed by a reference power source V1 generating a reference voltage $V_{ref}$ and including, for example, a voltage dividing resistor and Zener diode, a differential amplifier OP1 for comparing the average value of the analog signal of the above-mentioned average value detection circuit 64 and the reference voltage $V_{ref}$ to generate a control output to equalize the average value of the analog signal with the reference voltage $V_{ref}$, and a control transistor TR2 for using the control output of the said differential amplifier OP1 to adjust the base current to control the current flowing through the light emitting diode D1. In FIG. 11, R5, R6, and R7 are resistors and C3 is a capacitor.

Figure 13:
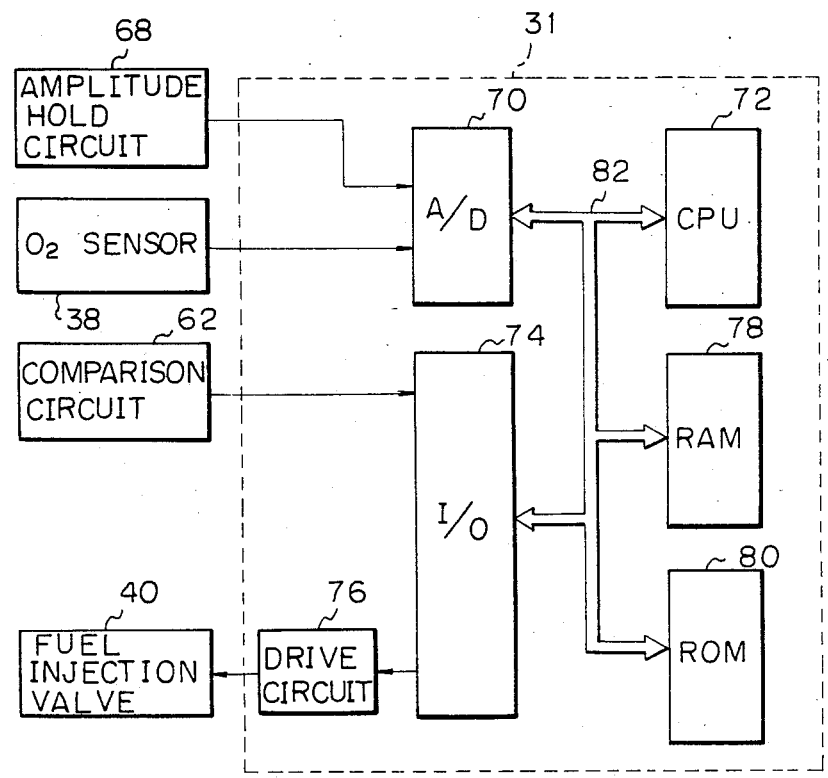
FIG. 13 is a block diagram showing in detail the control circuit shown in FIG. 3.

FIG. 13 is a block diagram showing in detail the control circuit 31 shown in FIG. 3.

The output signal $V_{out}$ of the amplitude hold circuit 68 and the voltage signal from the $O_2$ sensor 38 are sent to an analog/digital (A/D) converter 70 having an analog multiplexer function and are selectively converted to binary signals in accordance with selection signals supplied from a central processing unit (CPU) 72.

The frequency pulse B from the comparison circuit 62 (FIG. 7) is input through an input/output (I/O) port 74 to the CPU 72.

When an injection pulse signal of one bit having a duration corresponding to the injection pulse width TAU is output from a predetermined bit position of the I/O port 74, the drive circuit 76 converts this to a drive signal. This drive signal is sent to the fuel injection valve 40 and acts on the same, resulting in injection of an amount of fuel corresponding to the pulse width TAU.

The A/D converter 70, I/O port 74, and CPU 72 are connected to other main elements of a microcomputer, i.e., a random access memory (RAM) 78 and a read only memory (ROM) 80, via a bus 82.

The ROM 80 stores in advance various kinds of control programs, data used for their calculation processing, tables of the relations between the intake air amount Q and the amplitude $V_p$ (760) under standard atmospheric pressure, shown in FIG. 8, etc.

The CPU sends A/D conversion start instructions every predetermined time interval to the A/D converter 70. By this, the output of the amplitude hold circuit 68 and the output of the fuel tank 42 are A/D converted and stored in predetermined positions of the RAM 70.

Next, an explanation will be given of the operation of the control circuit 30 according to an embodiment of the present invention using the flow chart of FIG. 14 to FIG. 16.

Figure 14:
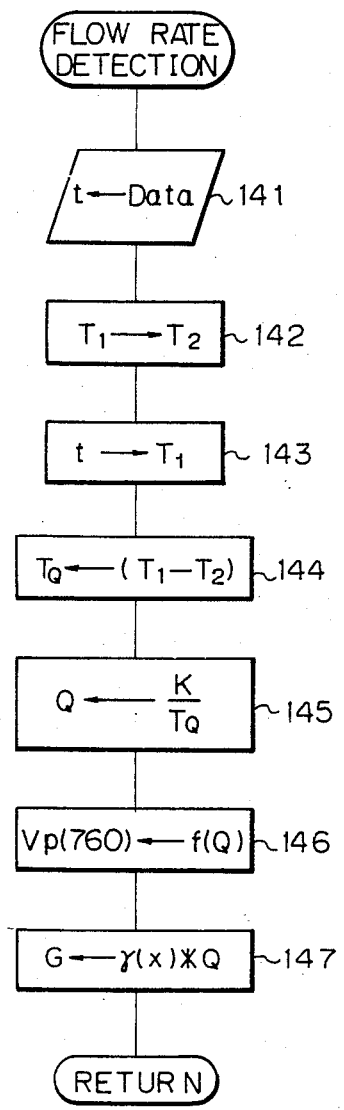
FIG. 14 is a flow chart showing the calculation routine for the intake air mass flow rate according to an embodiment of the present invention.

FIG. 14 is a flow chart of the calculation routine for detection of the intake air mass flow rate. In FIG. 14, steps 141 to 147 are performed with each rise of the frequency pulse B shown in FIG. 7. At steps 141 to 144, the rising time $T_1$ of the frequency pulse is detected and the difference with the previous rising time $T_2$ taken to find the cycle $T_Q$. At step 145, the constant K is divided by the period $T_Q$ to obtain the intake air volume flow rate Q, which is stored in a predetermined region of the RAM 78. At step 146, reference is made to the table stored in the ROM 80 and expressing the relationship shown in FIG. 8, and a value f(Q) corresponding to the specific volume of intake air Q obtained at step 145 and stored in the RAM 78 is used as the amplitude $V_p$(760) at the standard atmospheric pressure of 760 mmHg. At step 147, the air density $\gamma(x)$ obtained by the flow of FIG. 15 or FIG. 16 and stored in another predetermined region of the RAM 78 is multiplied with the specific volume of intake air Q obtained at step 145 and stored in the RAM 78 to find the intake air mass flow rate G.

Figure 15:
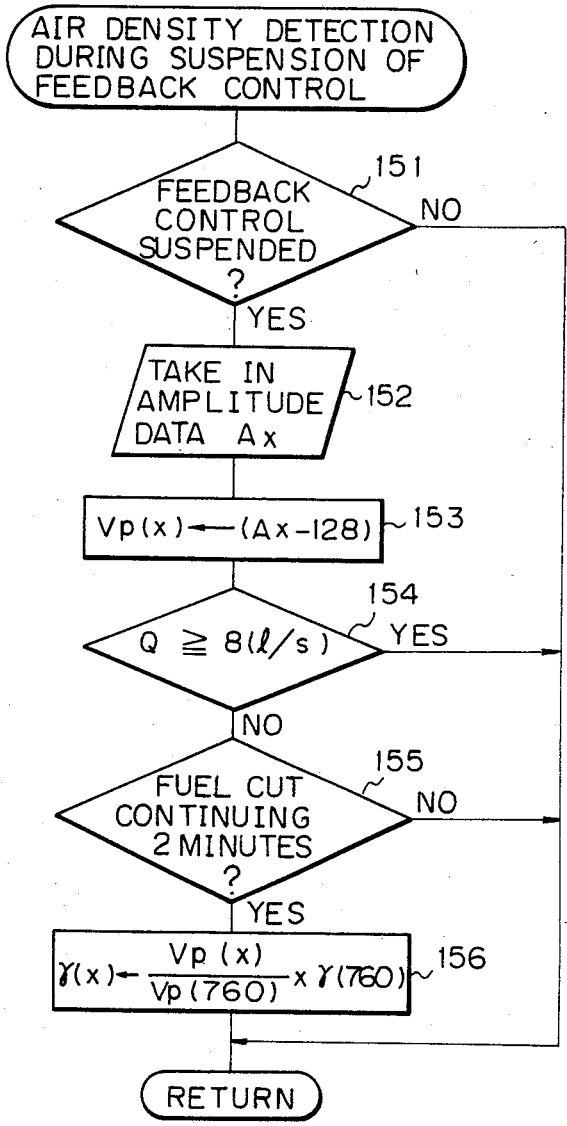
FIG. 15 is a flow chart showing the calculation routine for air density during suspension of air-fuel ratio feedback control.

FIG. 15 is a flow chart showing the calculation routine of air density $\gamma(x)$ during suspension of the air-fuel feedback control. In FIG. 15, this calculation is performed by interruption of the main routine (illustration omitted), for example, every one second. At step 151, it is judged whether or not the air-fuel ratio feedback control is suspended. This judgement is effected, for example, based on the output of the $O_2$ sensor 38 (FIG. 3). If not suspended, nothing is done, so the main routine is returned to. If suspended, at step 152, the amplitude data $A_x$ obtained from the output of the amplitude hold circuit 68 is taken in. The amplitude data $A_x$ is a digital value obtained from AD conversion of the peak voltage $V_{out}$ shown in FIG. 10. The central voltage 2.5 V shown in FIG. 10 is AD converted into, in this embodiment, the digital value 128.5 V corresponds to a digital value 256. At step 153, the difference between the amplitude data $A_x$ corresponding to the peak voltage $V_{out}$ and the digital value 128 corresponding to the central voltage 2.5 V is calculated. The calculated result is used as the amplitude Vp(x) at the current atmospheric pressure $\cdot$ XmmHg. At step 154, it is judged whether the intake air volume flow rate Q is a predetermined value or higher (in this embodiment, 8 liter/second). If Q is 8 liter/second or more, nothing further is done and the main routine is returned to. This is because, as shown in FIG. 8 and as previously mentioned, in the region where the intake air volume flow rate Q exceeds 8 liter/second, the relation of Vp(x) being proportional to $Q^2$ no longer stands. If Q is 8 liter/second or less, at step 155, it is judged whether the fuel cut, that is, the suspension of the supply of fuel, has continued for a predetermined time (in this embodiment, 2 minutes). If not, it is deemed that the engine was not running continuously for a long time from a high altitude to a low altitude and, in this embodiment, nothing more is done and the main routine is returned to. If the fuel cut continues for 2 minutes or more, it is deemed that the car ran continuously for a long time from a high altitude to a low altitude and, at step 156, the following is calculated:

$$\gamma(x) = V_p(x)/V_p(760) \times \gamma(760)$$

Here, Vp(x) is the amplitude value obtained at step 153; Vp (760) is the value obtained at step 146 of FIG. 14; and (760) is the air density at the standard atmospheric pressure of 760 mmHg. After step 156, the main routine is returned to. Therefore, the air density in the case where the fuel cut has continued for a long time and the air-fuel ratio feedback control by the $O_2$ sensor has been suspended can be suitably found from the Karman vortex air flow sensor.

Incidentally, when the fuel cut at step 155 does not continue for 2 minutes, the main routine is returned to without seeking the air density. This means that, since the fluctuations in atmospheric pressure are not large when fuel cuts of a short time occurs during running in flat areas, etc., calculation of the air density by the Karman vortex air flow sensor, whose precision is relatively poor, is not performed and the latest air density obtained from the air-fuel ratio feedbackk control by the $O_2$ sensor, mentioned later with respect to FIG. 16, is used. Under conditions where there are few fluctuations in the atmospheric pressure, the precision of the air density obtained by air-fuel ratio feedback control by the $O_2$ sensor is higher than that by the Karman vortex air flow sensor. Therefore, if the problem of precision is disregarded or if the output precision of a Karman vortex air flow sensor can be improved, the judgement at step 155 would not be necessary.

Figure 16:
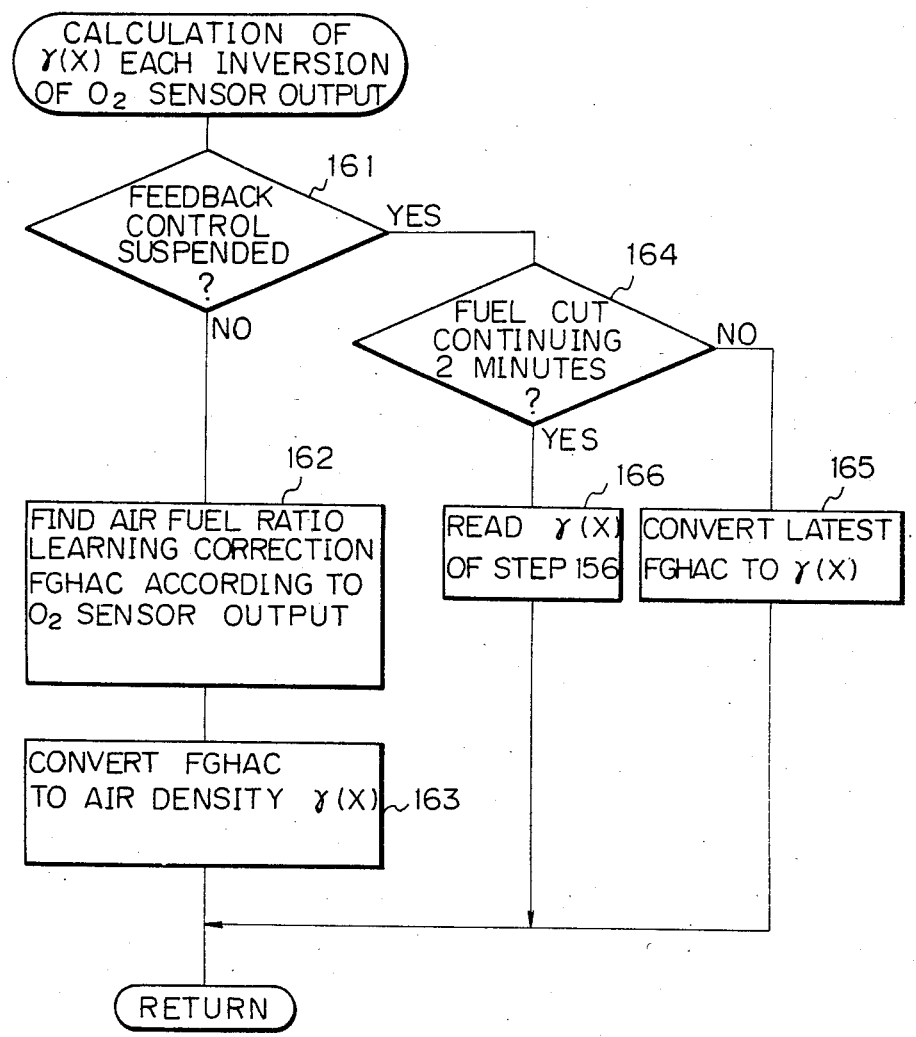
FIG. 16 is a flow chart showing the calculation routine for air density with each inversion of the output signal of the O$_2$ sensor according to an embodiment of the present invention.

FIG. 16 is a flow chart showing the calculation routine of air density $\gamma(x)$ with each inversion of the $O_2$ sensor signal. In FIG. 16, the calculation is effected by interruptions in the main routine each inversion of the output signal of the sensor 38 or with every 50 m sec. At step 161, judgement is made as to whether the air-fuel ratio feedback control is suspended, for example, based on the output of the $O_2$ sensor 38. If not suspended, i.e., if under feedback control, at step 162, the air-fuel ratio learning correction FGHAC for high altitude correction in response to output of the $O_2$ sensor 38 is found by a known method (see FIG. 17 and FIG. 18) and, next, at step 163, the FGHAC is multiplied by a predetermined coefficient for conversion to the air density $\gamma(x)$.

If the feedback control is suspended, the routine proceeds to step 164, where it is judged whether the fuel cut has continued for 2 minutes. If not, at step 165, the newest FGHAC (already found by the routine just before the current routine and being stored in the RAM 78) is read out, multiplied by the above-mentioned predetermined coefficient, and used as the air density $\gamma(x)$. If the fuel cut has continued for 2 minutes or more, at step 166, the air density $\gamma(x)$ found at step 156 of FIG. 15 is read out from the RAM 78.

At steps 163 and 165, the learning correction FGHAC is converted to the air density (x). The reasons this conversion is possible are as follows:

During air-fuel ratio feedback control by the $O_2$ sensor 18, the fuel injection pulse width TAU is calculated by the following formula, as is well known:

$$TAU = TAU_o \times FAF \times FGHAC$$

Here, $TAU_o$ is the basic injection pulse width, FAF is the air-fuel ratio feedback correction coefficient, and FGHAC is the air-fuel ratio learning correction for high altitude correction. During air-fuel ratio feedback control, it is detected based on the output of the $O_2$ sensor 18 whether the actual air-fuel ratio deviates to the rich side or the lean side from the theoretical air-fuel ratio. If deviating to the rich side, control is effected to reduce the FAF so as to reduce the fuel. If deviating to the lean side, control is effected to increase the FAF so as to increase the fuel. On the other hand, during suspension of air-fuel ratio feedback control, the FAF is fixed at 1.0. For this reason, it is necessary that the average value $FAF_{AVE}$ of the FAF during air-fuel ratio feedback control be made so as to be contained in a predetermined range centered on 1.0 and the air-fuel ratio in the transition from the suspension of feedback control to feedback control not be allowed to be too discontinuous. In particular, at high altitudes, since the atmospheric pressure is low, the actual air-fuel ratio deviates to the rich side. For this reason, the air-fuel ratio learning correction FGHAC for high altitude correction is reduced at high altitudes. Simultaneously, the FAF is increased. By this, the average value $FAF_{AVE}$ is contained in the above-mentioned predetermined range centered on 1.0. As clear from the reduction of the FGHAC at high altitudes, there is a correlative relation between the FGHAC and the atmospheric density $\gamma(x)$. A change in the FGHAC leads to a change in the atmospheric density $\gamma(x)$ as well. Therefore, the conversion at steps 163 and 165 becomes possible.

Figure 17:
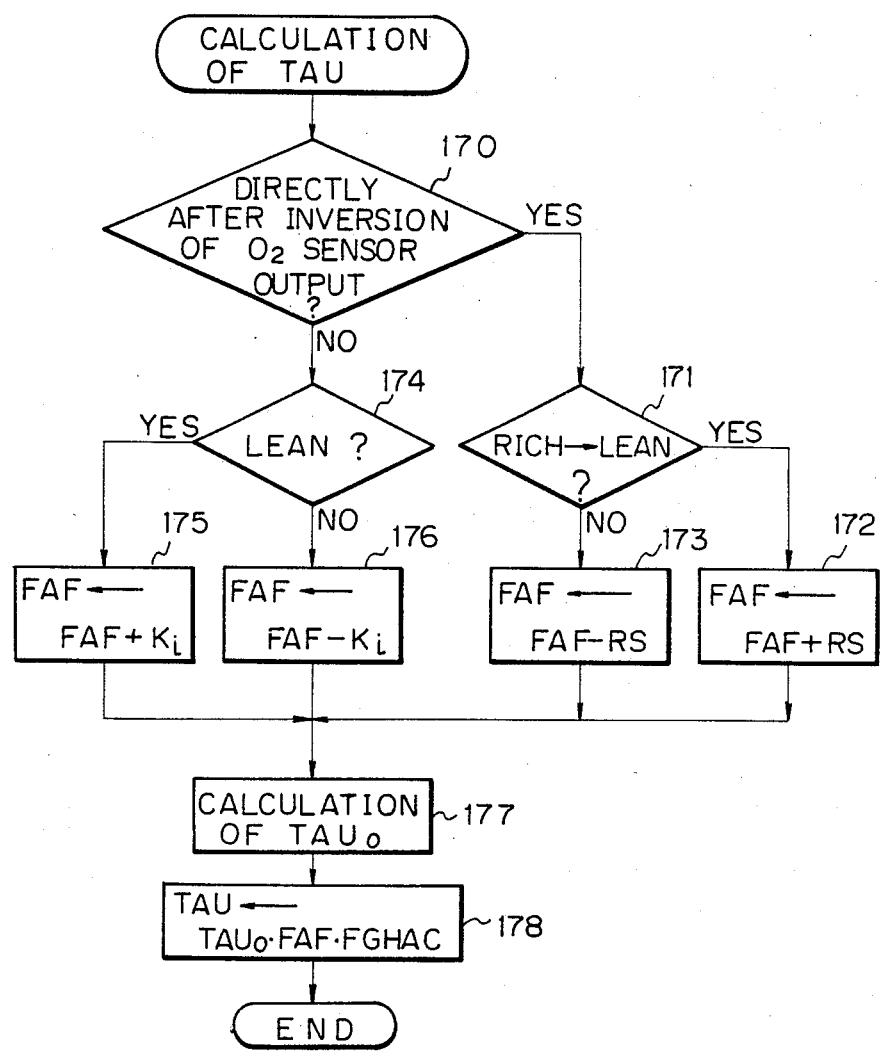
FIG. 17 is a flow chart showing an example of the calculation routine for a fuel injection pulse width, including calculation of the air-fuel ratio flow chart correction coefficient FAF.

FIG. 17 shows an example of a program for calculating the fuel injection pulse width TAU including the calculation of the air-fuel feedback correction coefficient FAF. The CPU 72 executes this processing during the main routine or at an interruption routine each predetermiend time.

First, at step 170, it is judged whether the output from the $O_2$ sensor 18 immediately followed inversion from a lean signal to rich signal or vice-versa. The output of the $O_2$ sensor 18 is compared with the critical value during the processing routine of FIG. 17 or the processing routine executed upon completion of A/D conversion. If it is larger, a binary value is given as a rich signal. If it is smaller, a binary signal is given as a lean signal.

If just after inversion of the output from the $O_2$ sensor 1b, the routine proceeds to step 171 where it is judged whether the inversion was from rich to lean. If the inversion was from rich to lean, the routine proceeds to step 172 andthe air-fuel ratio feedback correction coefficient FAF is increased by exactly RS. If the inversion was from lean to rich, the routine proceeds to step 173 and the FAF is reduced by just RS. The processing of step 172 and 173 is known as skip processing and is meant to widely change the FAF in the direction opposite to the current one upon inversion of the $O_2$ sensor output so as to improve control characteristics.

At step 170, if judged not just after inversion, the routine proceeds to step 174 and it is judged whether the $O_2$ sensor output is rich or lean. If lean, the routine proceeds to step 175, where FAF is increased by just Ki (Ki<<RS). If lean, FAF is reduced by Ki at step 176. Therefore, if lean, the FAF is gradually increased by Ki, while if rich, it is gradually decreased by Ki. In this way, step 175 and step 176 integrate FAF in accordance with the $O_2$ sensor output. Integration is to the increasing direction when lean and to the decreasing direction when rich.

At the next step 177, the basic injection pulse width $TAU_o$ is found from the intake air volume flow and the rotational speed by a well-known method. Next, at step 178, the final injection pulse width TAU is found by the following equation from the basic pulse width $TAU_0$, the air-fuel ratio feedback correction coefficient FAF, and the learning correction amount FGHAC found by the processing routine of FIG. 18.

$$TAU = TAU_0 \times FAF \times FGHAC$$

Various methods are known for preparing an injection pulse signal having a duration corresponding to TAU from the injection pulse width TAU calculated in this way. For example, it is possible to invert the injection pulse signal to "1" when the injection start timing signal is generated and to determine the value of the afore-mentioned free counter at that time so as to set the counter value after the elapse of TAU to a compare register. When the value of the free counter becomes equal to the value set in the compare register, the innerrupt is generated and the injection pulse signal inverted to "0". By this, it is possible to form an injection pulse signal with a duration corresponding to TAU.

Figure 18:
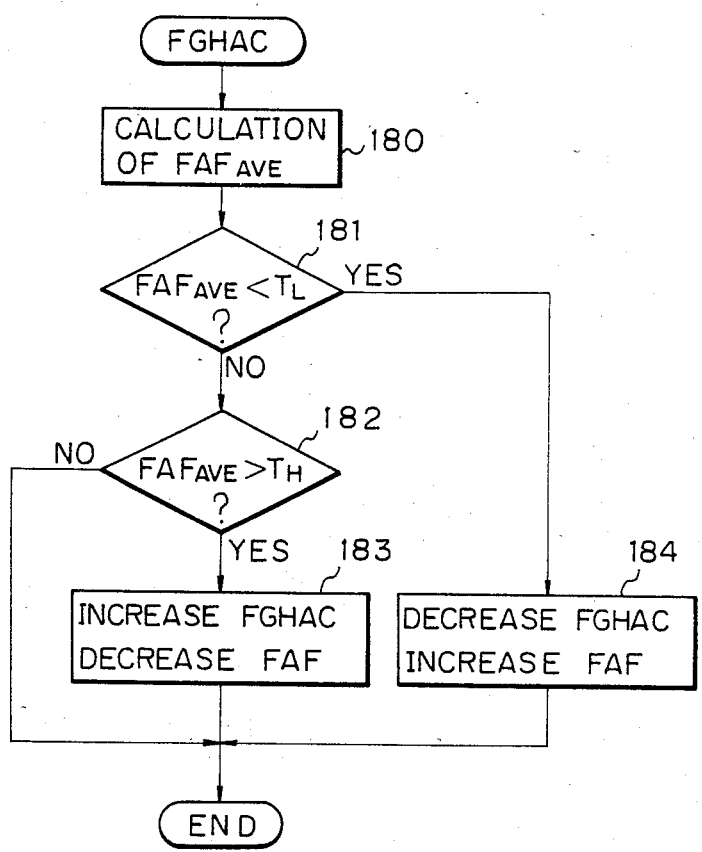
FIG. 18 is a flow chart showing an example of the calculation routine of the learning correction amount for high altitude correction.

FIG. 18 shows a calculation program for the learning correction amount FGHAC for high altitude correction.

At step 180, the CPU 71 calculates the average value $FAF_{AVE}$ of the air-fuel ratio feedback correction coefficient FAF within a specified term. Next, at step 181, it is judged whether this average value $FAF_{AVE}$ is smaller than a low limit $T_L$. If $FAF_{AVE} < T_L$, the base air-fuel ratio (air-fuel ratio before air-fuel ratio correction by feedback control) is too rich, so the routine proceeds to step 184, where the air-fuel ratio learning correction amount FGHAC is reduced and, simultaneously, the FAF is increased. The FAF is increased so as to increase the speed of control of the air-fuel ratio by feedback integration control.

When the average value $FAF_{AVE}$ is equal to or greater than the low limit $T_L$, the routine proceeds to step 182 and judgement is made whether $FAF_{AVE}$ is greater than a high limit $T_H$. When $FAF_{AVE} > T_H$, the base air-fuel ratio is too lean, so the routine proceeds to step 183, where FGHAC is increased and, simultaneously, FAF is decreased.

If $FAF_{AVE}$ is equal to or lower than the high limit $T_H$ at step 182, $T_H \leq FAF_{AVE} \leq$ and the base air-fuel ratio is within the the allowable range, so no FGHAC learning is effected.

In the above-mentioned embodiments, the intake air mass flow rate was found from the output of the Karman vortex air flow sensor only when the fuel cut has continued for over a predetermined period of time. It is also possible, however, to obtain the intake air mass flow rate from the output of the Karman vortex air flow sensor at all times irregardless of the existence of a fuel cut or air-fuel ratio feedback control. In this case, the control shown in the flow chart of FIG. 16 is not necessary and step 151 and step 155 in the flow chart shown in FIG. 15 are not necessary. Further, step 154 in FIG. 15 is not necessary if improvements are made in the vibration chamber of the vibration plate of the Karman vortex air flow sensor and occurrence of saturation phenomenon of the amplitude as shown in FIG. 8 is eliminated. Further, the present invention is not restricted to use of the signal processing circuit shown in FIG. 5. Various other modifications are possible.

As explained above, according to the present invention, attention has been focused on the predetermined relation between the amplitude of the output of a Karman vortex air flow sensor and the intake air volume flow rate. An inexpensive amplitude hold circuit is added to enable accurate detection of the intake air mass flow rate corresponding to any atmospheric pressure. Therefore, even when an internal combustion engine is operating continuously from a high altitude with a low atmospheric pressure to a flat area, it is possible to prevent deterioration of the exhaust gas and engine stalling without a large increase in cost.

We claim:

1. An intake air mass flow rate detection apparatus using a Karman vortex air flow sensor, comprising a Karman vortex air flow sensor arranged in an intake passage of an internal combustion engine, comparison means for obtaining a digital signal by comparison of an analog signal obtained from the output of said Karman vortex air flow sensor with a predetermined threshold level, and volume flow rate calculation means using a value proportional to the frequency of said digital signal as the intake air volume flow rate and further provided with:

amplitude hold means for holding the amplitude value of analog signals obtained from the output of said Karman vortex air flow sensor;

storage means for storing in advance a relationship between the intake air volume flow rates and the amplitude values of the analog signals obtainable from the output of said Karman vortex air flow sensor under standard atmospheric pressure;

an intake air density calculation means for calculating an intake air density $\gamma(x)$ in accordance with the formula:

$$\gamma(x) = \gamma(760) \times V_p(x)/V_p(760)$$

where $\gamma(760)$ is the air density under standard atmospheric pressure, $V_p(x)$ is the amplitude value of the analog signal held in the amplitude hold means, and $V_p(760)$ is the amplitude value of the analog signal under standard atmospheric pressure, said $V_p(760)$ being stored in said storage means and corresponding to the intake air volume flow rate from said volume flow rate calculation means; and mass calculation means for multiplying the intake air volume flow rate obtained by said volume flow rate calculation means by said intake air density for obtaining the intake air mass flow rate.

2. An intake air mass flow rate detection apparatus as set forth in claim 1, further comprising:

fuel supply termination judgement means for judging, based on a first operating condition parameter of said internal combustion enbine, whether the termination of supply of fuel to said internal combustion engine should continue a predetermined time or more;

means for learning, based on a second operating condition parameter of said internal combustion engine, an air-fuel ratio learning correction amount during supply of said fuel or when the time of termination of supply of said fuel is shorter than said predetermined time; and conversion means for converting the air-fuel ratio learning correction amount to intake air density;

said $V_p(x)$ being stored in said amplitude hold means when the supply of the fuel has stopped for a predetermined time or more.

3. A method for detecting an intake air mass flow rate using a Karman vortex air flow sensor arranged in an intake passage of an internal combustion engine, comprising the steps of:

obtaining an analog signal from said Karman vortex air flow sensor;

comparing said analog with a predetermined threshold level for obtaining a digital signal;

calculating an intake air volume flow rate by using a value proportional to the frequency of said digital signal as the intake air volume flow rate;

holding the amplitude of said analog signals obtained from the output of said Karman vortex air flow sensor;

storing in advance a relationship between the intake air volume flow rates and the amplitude values of the analog signals obtainable from the output of said Karman vortex air flow sensor under standard atmospheric presure;

calculating an intake air density $\gamma(x)$ in accordance with the formula:

$$\gamma(x) = \gamma(760) \times V_p(x)/V_p(760)$$

where $\gamma(760)$ is the air density under standard atmospheric pressure, $V_p(x)$ is the amplitude value of the analog signal held in said amplitude holding step, and $V_p(760)$ is the amplitude value of the analog signal under standard atmospheric pressure, said $V_p(760)$ being previously stored in said storing step and corresponding to the intake air volume flow rate obtained in said calculating step of the intake air volume flow rate; and calculating an intake air mass flow rate by multiplying the intake air volume flow rate obtained in said calculating step of the intake air volume flow rate with said intake air density.

4. A method as set forth in claim 3, further comprising the steps of:

judging, based on a first operating condition parameter of said internal combustion enbine, whether the termination of supply of fuel to said internal combustion engine should continue a predetermined time or more;

learning, based on a second operating condition parameter of said internal combustion engine, an air-fuel ratio learning correction amount during supply of said fuel or when the time of termination of supply of said fuel is shorter than said predetermined time; and converting the air-fuel ratio learning correction amount to intake air density;

said $V_p(x)$ being stored in said holding step when the supply of the fuel has stopped for a predetermined time or more.

* * * * *

UNITED STATES PATENT AND TRADEMARK OFFICE
CERTIFICATE OF CORRECTION

PATENT NO. : 4,589,279
DATED : May 20, 1986
INVENTOR(S) : M. Mitsuyasu et al.

It is certified that error appears in the above-identified patent and that said Letters Patent is hereby corrected as shown below:

Column 3, line 65, change "obtained flow" to --obtained from the output of the Karman vortex air flow--.

Column 4, line 21, change "the " to --the--.

Column 5, line 9, change "is in the" to --is the--.

Column 8, line 43, change "128.5 V corresponds" to --128.5 V and corresponds--.

Column 9, line 17, change "occurs" to --occur--.

Column 9, line 32, change "effected" to --affected--.

Column 9, line 34, after "routine" insert a comma.

Column 10, line 46, change "andthe" to --and the--.

Column 10, line 58, change "(Ki≤≤RS)" to --(Ki RS)--.

Column 11, line 16, change "iner-" to --inter---.

Column 11, line 43, change "$T_H \leq FAF_{AVE} \leq$" to --$FAF_{AVE} = T_H$--.

UNITED STATES PATENT AND TRADEMARK OFFICE
CERTIFICATE OF CORRECTION

PATENT NO. : 4,589,279
DATED : May 20, 1986
INVENTOR(S) : M. Mitsuyasu et al.

It is certified that error appears in the above-identified patent and that said Letters Patent is hereby corrected as shown below:

Column 11, line 52, change "irregardless" to --regardless--.

Column 12, line 51, change "enbine" to --engine--.

Column 13, line 5, between "analog" and "with" insert the word --signal--.

Column 13, line 17, change "presure" to --pressure--.

Column 14, line 12, change "enbine" to --engine--.

Signed and Sealed this

Eleventh Day of November, 1986

*Attest:*

DONALD J. QUIGG

*Attesting Officer*   *Commissioner of Patents and Trademarks*